May 5, 1931.   C. B. LITTERIO   1,804,383
CYLINDER GAUGE
Filed Dec. 27, 1928
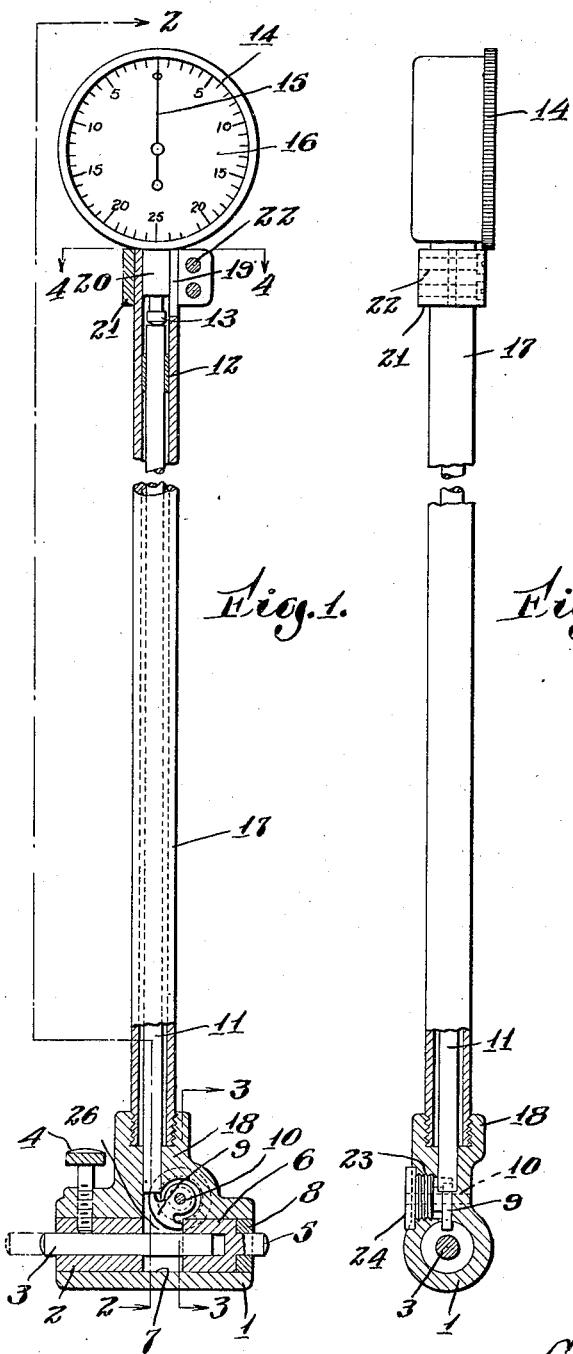
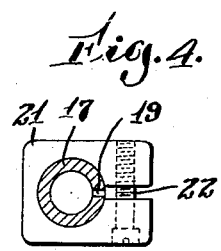
Inventor
Caesar B. Litterio
by James R. Hodder
Attorney Patented May 5, 1931

1,804,383

UNITED STATES PATENT OFFICE

CAESAR B. LITTERIO, OF PROVIDENCE, RHODE ISLAND, ASSIGNOR TO FEDERAL PRODUCTS CORPORATION, OF PROVIDENCE, RHODE ISLAND, A CORPORATION OF RHODE ISLAND

CYLINDER GAUGE

Application filed December 27, 1928. Serial No. 328,733.

The present invention relates to gauges, and more particularly to gauges adapted to be utilized to measure the internal diameter of cylindrical objects.

An important object of the present invention is the provision of a cylinder gauge which will be simple in the extreme to manufacture and assemble, and which will have a minimum number of parts.

Another important feature of the invention is the elimination of all springs in the cylinder-engaging portion of the device, the only spring utilized being in the indicating member or reading portion of the gauge.

A further feature of the invention resides in providing but two contact points, one an adjustable point adapted to be secured in adjusted position, and the other a freely movable feeler, horizontally and co-axially arranged with respect to the fixed contact point.

This movable feeler is adapted to transmit movement to a vertically movable rod by means of a pivoted rocker interposed between said feeler and said rod. Vertical movement of the rod will transmit movement to the plunger of a suitable gauge and will indicate, on the dial of the gauge, the accurate and precise internal measurements of the cylinder being measured.

Another feature of the invention resides in the particular construction of the base portion of my novel gauge, within which is housed and pivoted the rocker above mentioned.

A still further feature of the invention resides in a simple and efficient method of attaching the indicating element to the gauge.

The above and further features of the invention, details of construction, combinations of parts and advantages, will be hereinafter more fully pointed out, described and claimed.

Referring to the drawings, illustrating a preferred embodiment of the present invention, Fig. 1 is a front elevation, partly in section, of my novel gauge;

Fig. 2 is a side sectional elevation on the line 2—2 of Fig. 1;

Fig. 3 is a vertical sectional view on the line 3—3 of Fig. 1; and

Fig. 4 is a cross-sectional view on the line 4—4 of Fig. 1.

Referring now to the drawings, for a particular description of the invention, its construction, assembly and operation, 1 designates a base member adapted to be inserted in a cylinder to be measured. In this base 1 is a force washer 2, and adjustable through this washer 2 is a contact point 3, the length of the contact point 3, as clearly illustrated in the drawings, permitting a wide range of adjustments. When the contact point 3 is adjusted to proper position, as illustrated in Fig. 1, in either full lines, or in dotted lines for example, it is firmly and securely retained in adjusted position by means of a knurled set screw 4 passing through threaded apertures in the base 1 and also in the washer 2.

Co-axially arranged with respect to the point 3 is a movable feeler 5 having a cup-shaped portion 6. This feeler is slidable in an aperture 7 in the base 1 and through a force washer 8 for alining purposes. When the contact point 3 is in the position illustrated in full lines in Fig. 1, the movable feeler 5 will also slide over the inner end of said point 3.

Movement of the feeler 5 inwardly will transmit movement to the rocker or bell-crank lever 9 pivoted on a pin 10 and said rocker will, in turn, transmit said movement to a vertically slidable rod 11. This rod 11 has bearings, at its lower end in the base 1, and at its upper end in a force washer 12, to insure alinement and vertical travel of said rod.

On the transmission of movement to the rod 11, such movement will in turn be transmitted by said rod to the plunger 13 depending from an indicating element 14 and will actuate the needle or indicator 15 to indicate on the dial 16 of said indicating element the precise internal measurement of the cylinder being measured.

The rod 11 is housed within a tube 17 which is threaded at its lower end into a boss 18 on the base 1, said tube carrying the force washer 12, and being split at its upper end as at 19. The indicating element 14 has a depending stem 20 which is inserted into the top of the tube 17 and surrounding said tube, at said split portion and just below said indicating element 14, is a split collar 21, screws 22 being provided to clamp said collar to said sleeve or tube 17 and the pressure of which will securely clamp the split end of said tube about the stem 20.

Provided in one side of the base 1 is a threaded aperture 23, through which the rocker 9 is inserted. Thereupon the pin 10 is applied, and a threaded plug 24 is threaded into the aperture 23. This plug 24 has a central aperture adapted to fit over the pin 10, so that the pin 10 has a bearing in said plug on one side of the rocker 9 and in the base 1 on the other side of said rocker. The inner end of the plug 24 is provided with a reduced portion 25, the rocker 9 being confined between and guided by this reduced portion 25 on one side and the inner surface 26 of the base on the other side.

The spring which is in the indicating element 14 will normally keep the plunger 13 depressed, and the same, plus the weight of the rod 11, through the medium of the rocker 9, will normally hold the feeler 5 in extended position. The rocker 9, being freely movable on the pivot pin 10, will not exert any frictional resistance to movement thereof by the feeler 5, freely and instantly transmitting movement from said feeler to the rod 11 and indicator 14.

It will thus be appreciated that I have devised a novel, efficient, economical, simple, desirable cylinder measuring gauge, the advantages and utility of which will be readily apparent to those skilled in the art, and since I believe said device is novel, I have claimed the same in the present application.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In a cylinder gauge, a base, a contact adjustable in said base, means to secure said contact in adjusted position, a movable feeler co-axially arranged with respect to said contact, indicator actuating means, a pivoted rocker in said base interposed between said feeler and said actuating means for transmitting movement from said feeler to said actuating means, said base having an aperture at one side thereof through which said rocker may be inserted, and a plug for said aperture, the pivot for said rocker bearing in said plug and said base.

2. In a cylinder gauge, a base, a contact adjustable in said base, means to secure said contact in adjusted position, a movable feeler co-axially arranged with respect to said contact, indicator actuating means, a pivoted rocker in said base interposed between said feeler and said actuating means for transmitting movement from said feeler to said actuating means, said base having an aperture at one side thereof through which said rocker may be inserted, and a plug for said aperture, the pivot for said rocker bearing in said plug and said base, said plug having a reduced portion on the inner end thereof, and said rocker being confined between said reduced portion and said base.

In testimony whereof, I have signed my name to this specification.

CAESAR B. LITTERIO.